United States Patent [19]

Lenkevich

[11] 4,022,182

[45] May 10, 1977

[54] DUST AND WATER CONFINEMENT UNIT FOR PORTABLE CIRCULAR SAW

[76] Inventor: Steve T. Lenkevich, 1723 Warren St., New Cumberland, Pa. 17070

[22] Filed: Jan. 12, 1976

[21] Appl. No.: 648,314

[52] U.S. Cl. .................. 125/13 R; 30/390; 51/273

[51] Int. Cl.² ............................. B28D 1/04

[58] Field of Search ............... 30/390, 391; 125/13, 125/14; 51/273

[56] References Cited

UNITED STATES PATENTS

| 2,742,974 | 4/1956 | Landgraf | 51/273 X |
| 3,034,493 | 5/1962 | Bandy | 125/13 R |
| 3,585,980 | 6/1971 | Mellor | 125/13 R |
| 3,722,496 | 3/1973 | Schuman | 125/13 R |
| 3,896,783 | 7/1975 | Manning | 125/13 R |

*Primary Examiner*—Harold D. Whitehead
*Attorney, Agent, or Firm*—Jay L. Seitchik

[57] ABSTRACT

A housing unit is disclosed for use with portable circular saws. The housing unit comprises a rigid structure which completely encloses the cutting blade of the saw and which confines water and dust particles so as to permit their removal by suction means whereby the operator and the surrounding atmosphere are protected from the debris which accompanies a sawing operation.

6 Claims, 5 Drawing Figures

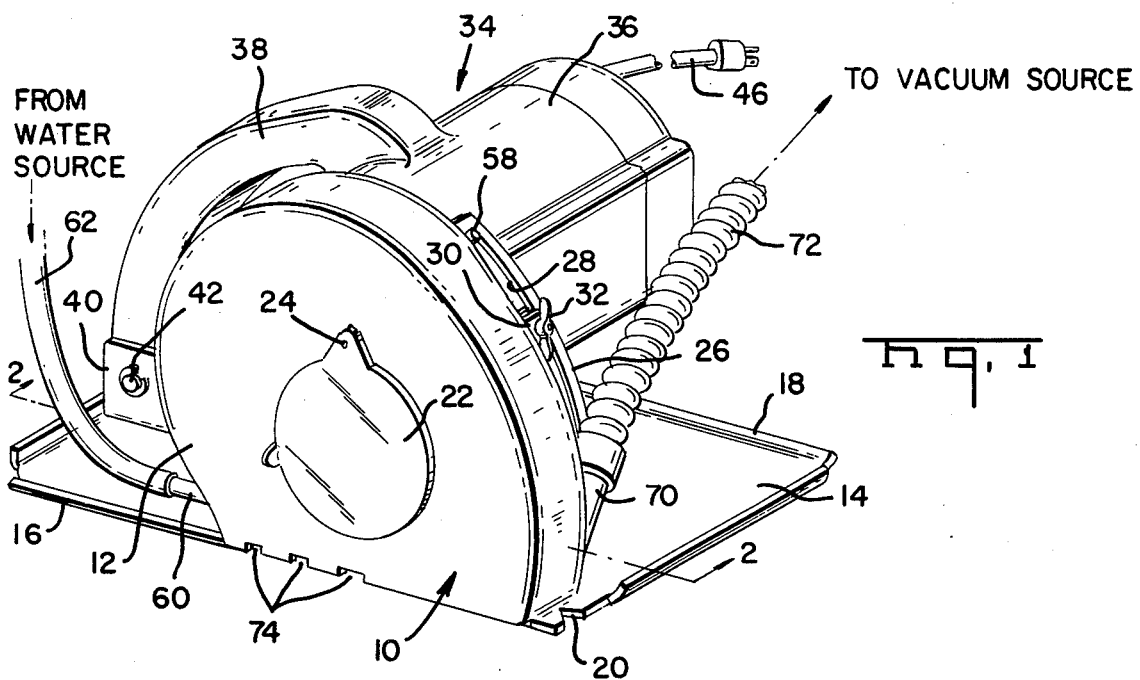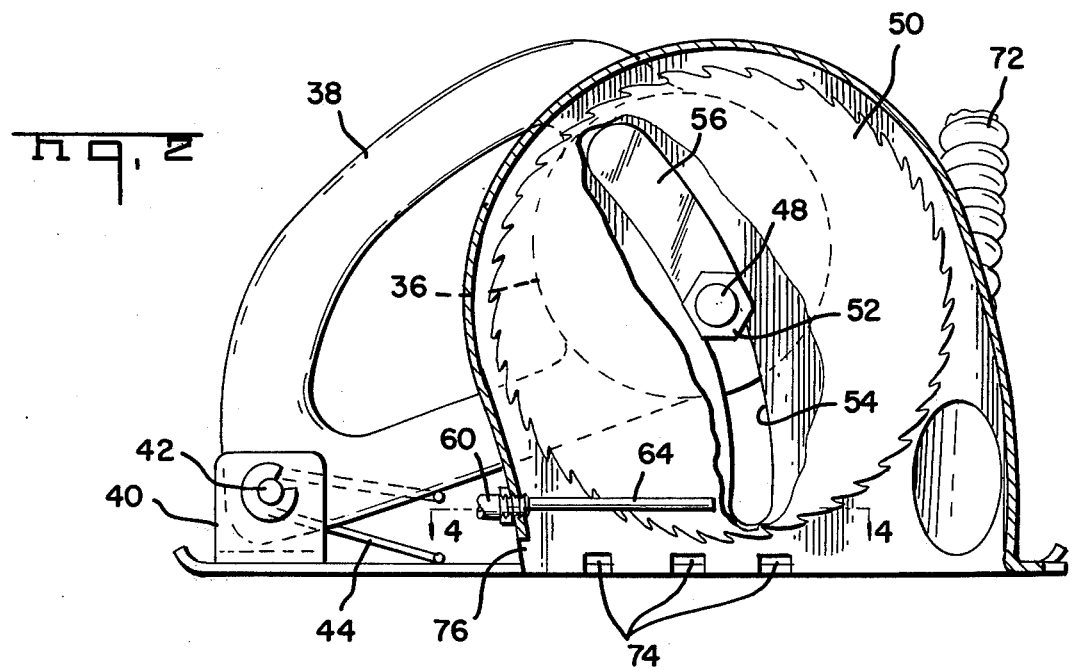

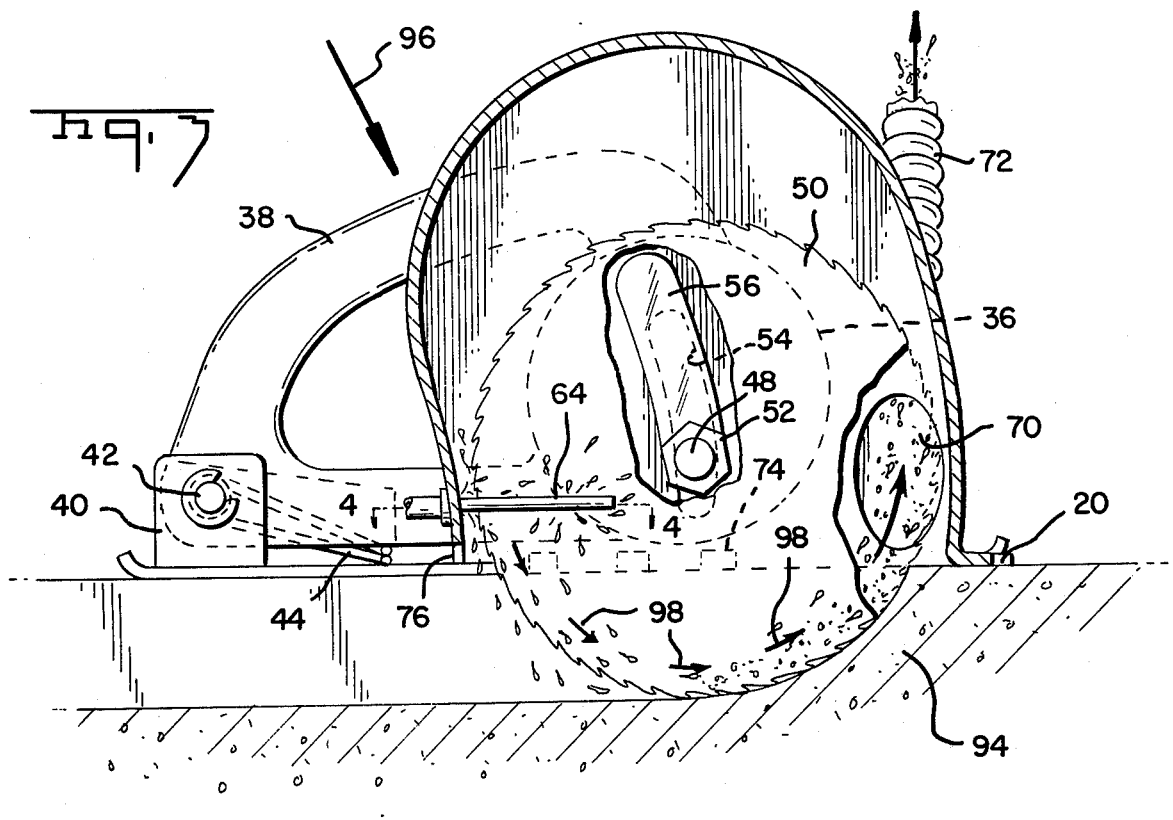
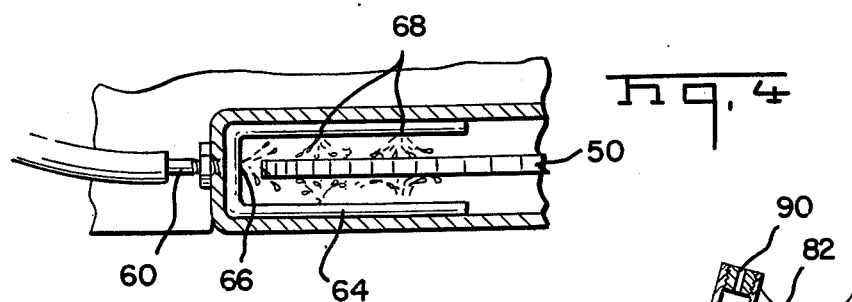
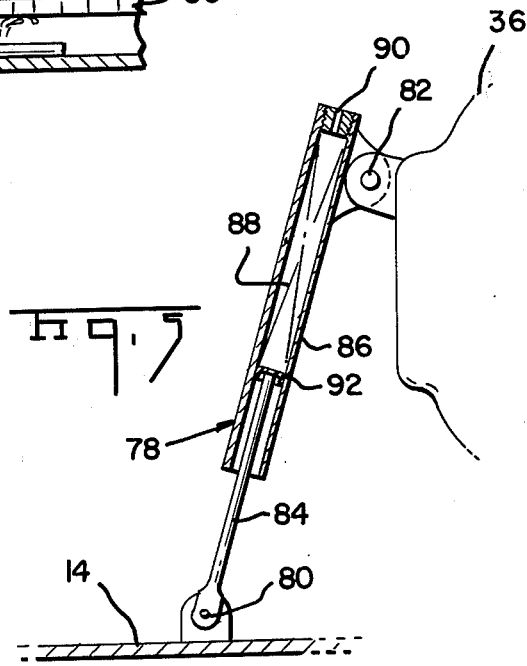

4,022,182

DUST AND WATER CONFINEMENT UNIT FOR PORTABLE CIRCULAR SAW

BACKGROUND OF THE INVENTION

Portable circular saws are tools which are commonly used in the construction industry for building and remodeling purposes. The tools are used both for factory and on-site construction. The circular saw is an extremely efficient tool for cutting many different types of materials including such obvious ones as wood, plastic laminates, stone, masonry and the like.

One problem which is associated with tools of this type concerns the debris which accompanies a sawing operation. Commercially available circular saws typically rotate the cutting blade at speeds ranging from 4000 to 6000 revolutions per minute. This high speed operation of the cutting blade causes the sawdust and other particles resulting from the cut to be expelled into the surrounding air thus creating a hazard to the operator and causing the building location to become filled with dust particles. Certain types of cutting operations also require the introduction of cooling fluid, such as water, onto the cutting blade, and this fluid is also expelled into the atmosphere further contaminating the building site. When the cutting operation is being performed as part of a remodeling operation in a home, office building, hospital or the like, a major problem arises with respect to the attempt to confine the cutting debris and to subsequently clean up the building site. This can be a very costly procedure.

Conventional saws employ guards to protect the operator from contact with the cutting blade. These guards normally take the form of a stationary upper guard and a lower movable guard which is capable of covering the lower portion of the cutting blade and which can be swung or rotated out of the way during a cutting operation. These guards are wholly ineffective in controlling the confinement of dust or water during a cutting operation. Attempts have been made to combine a suction removal hose with a conventional guard, such as in U.S. Pat. No. 3,882,598, but such arrangements provide only slight improvement over conventional circular saws. Other attempts have been suggested whereby telescoping blade guards have been combined with suction sources in an attempt to remove dust during a cutting operation, but these efforts have not resulted in a suitable acceptable cutting tool. An example of such efforts can be seen in U.S. Pat. No. 3,034,493.

OBJECTS AND SUMMARY OF THE INVENTION

Accordingly, it is an object of this invention to provide an improved dust and water confinement unit for portable circular saws.

Another object of the present invention is to provide an improved means for confining and removing the debris of a cutting operation.

A further object is to provide a structure which performs the above objects while being of rather simple and inexpensive construction.

In accordance with the above objects, the dust and water confinement unit of the present invention comprises an integral housing unit which completely encloses the cutting blade of the tool and which is secured to the base plate or shoe plate of the saw for movement along the upper surface of the workpiece. The cutting blade and motor housing are pivotally movable relative to the housing unit and are spring biased to a position within such unit. Means are provided for introducing water onto the cutting surface of the blade and means are also provided for removing the water and dust particles from the housing unit through suction or the like.

These and other objects will become apparent as a reading of the description proceeds.

BRIEF DESCRIPTION OF THE FIGURES

In the drawings, in which like reference numerals refer to like parts:

FIG. 1 is a perspective view of a dust and water confinement unit for portable circular saws constructed in accordance with the teachings of the present invention;

FIG. 2 is a side view, partly in section, taken along the line 2—2 of FIG. 1;

FIG. 3 is a side view similar to FIG. 2 but showing the tool during a cutting operation;

FIG. 4 is a sectional view taken along the line 4—4 of FIG. 3 showing details of the fluid inlet; and FIG. 5 is a fragmentary view showing an alternative means for biasing the confinement unit of the invention.

DETAILED DESCRIPTION

With reference now to the drawings, and in particular to FIG. 1, there is shown a dust and water confinement unit indicated generally at 10 and comprising a housing member 12 of appropriate size and shape so as to receive completely the circular cutting blade of a portable saw. Housing 12 is rigidly secured to base or shoe plate 14, the shoe plate being of generally standard construction in that it is provided with edges 16 and 18 which may be used for guiding the saw together with a notch 20 in alignment with the cutting blade and which is also used for guiding purposes.

One side of housing 12 is provided with a cover plate 22 secured to the housing by pivot means 24 to provide access to the arbor or shaft of the motor as will become apparent as the description proceeds. The opposite side of housing 12 from cover plate 22 is provided with an arcuate plate 26 secured to the housing and having a slot 28 formed therein. Disposed within this slot is a stop member 30 which may be adjustably secured in any position along the slot by means of a wing nut or the like 32 which serves to press the stop member against plate 26 to thereby secure the members in position.

With reference to FIGS. 1 and 2, a portable circular saw is shown and indicated generally at 34, the saw comprising a motor housing 36 and a handle 38 to be grasped by an operator. It should be noted at this point that no effort has been made to depict a particular type or style of saw, nor the saw of any particular manufacturer, but rather the drawings are intended merely to represent circular saws generally since it will be apparent that the confinement unit of the present invention has utility with many various styles of commercial circular saws.

A pivot block 40 is rigidly secured to shoe plate 14 and carries a pivot pin 42 which is connected to the lower portion of handle 38 whereby the handle and motor housing 36 are capable of pivoting movement relative to shoe plate 14 and thus to housing member 12. The handle 38 and motor housing 36 are normally biased in an upward direction as seen in FIG. 2 by means of a spring member 44 suitable disposed around pivot pin 42 and operable against the upper surface of shoe plate 14 and the lower surface of handle 38. The motor (not shown) disposed within housing 36 may be electrically or gas driven, FIG. 1 showing an electrically driven motor which is connected by power cord 46 to a suitable electrical source. The motor also includes a shaft or arbor 48 (see FIG. 2) which receives the cutting blade 50, the cutting blade being secured to the arbor by conventional retaining means such as nut 52. It can now be seen that pivotal movement of cover plate 22 permits the operator to have access to arbor 48 and nut 52 to permit removal and replacement of the cutting blade.

An arcuate slot 54 is formed in the side of housing 12 adjacent the motor for receiving the arbor and for permitting pivotal movement of the motor and cutting blade relative to the housing 12. A closing plate 56 is carried by the arbor 48 and movable along with the arbor in an arcuate path to partially close the slot 54 thereby assisting in confining the dust and water within the housing 12. A pin 58 (see FIG. 1) is secured to motor housing 36 and movable within slot 28 during arcuate movement of the motor housing towards a workpiece. The limit to which the motor housing, and thus the cutting blade, can be rotated relative to the housing is determined by the location of stop member 30 which is designed to be engaged by pin 58 thereby providing a simple means for adjusting the depth of cut of the saw.

There are certain types of cutting blades used primarily with workpieces such as stone or masonry which require the use of fluid for cooling and cleaning the blade during the cutting operation. One such blade is a diamond grit blade comprising diamonds retained in powdered metal segments that are braised to a metal blank. When such blades are used, the present invention provides for the introduction of cooling fluid by means of a nozzle 60 suitably secured to the lower portion of housing 12 adjacent the point where housing 12 and base plate 14 are connected. A flexible hose 62 is secured to nozzle 60 and leads from a water source (not shown). With reference now to FIG. 4 it can be seen that nozzle 60 comprises a substantially U-shaped member 64 having an aperture 66 adjacent the edge of cutting blade 50 and additional apertures 68 suitably located for directing cooling fluid against the side surfaces of the cutting blade.

At the opposite side of housing 12 from the water inlet there is provided a discharge tube 70 disposed at an angle from the housing 12 and connected to a flexible hose 72 connected to a suitable suction source such as a portable heavy duty industrial vacuum. The discharge tube is located adjacent the intersection of the forward portion of housing 12 with shoe plate 14 so as to be in a position immediately adjacent the forward cutting portion of the cutting blade. The air inlet into the housing 12 is provided by means of a series of cutouts 74 located along the side of housing 12 adjacent the housing end remote from discharge tube 70. An additional cutout 76 is provided along the end face of housing 12 immediately below the water inlet mozzle 60. The cutouts 74 and 76 permit air to enter the housing 12 prior to being evacuated through the discharge tube 70 and also perform the function of gathering loose particles and chips immediately outside of the housing and causing the chips to be drawn into the housing and out through the discharge tube.

With reference now to FIG. 5 there is shown an alternative structure for maintaining the circular saw in an upwardly biased position relative to the confinement unit 10. A spring unit is shown and indicated generally at 78 and is secured to shoe plate 14 by means of pivotal connection 80 and is secured to motor housing 36 by means of pivotal connection 82. A spring rod 84 extends from pivot 80 and is movable within a spring tube 86 having a spring 88 disposed therein. The upper portion of tube 86 is provided with threaded member 90 which operates to vary the air pressure within tube 86 and thus to adjust the spring force exerted by spring unit 78 during pivotal movement of the saw. A cup shaped member 92 is disposed at the end of rod 84 for movement within the spring tube. By proper selection and disposition of the cup shaped member, the spring unit 78 can be caused to exert maximum spring force in either the upward or downward direction, depending on the particular use of the circular saw and the particular desires of the saw operator.

The operation of the dust and water confinement unit of the present invention will now be described with reference particularly to FIG. 3. At the beginning of a cutting operation, the shoe 14 is disposed on the top surface of a workpiece 94 and the cutting blade is in its fully raised position within the confinement unit 10. Once the power is turned on, the blade begins rotating and the operator slowly moves the saw in a downward direction indicated by arrow 96 in FIG. 3, such downward movement being resisted by the force of spring member 44 and spring unit 78, should the latter be used. Water is caused to flow into nozzle 60 for discharge through the apertures 66 and 68. This water is initially simply directed across the cutting blade along the top surface of the workpiece and through discharge tube 70 to a collection reservoir. Continued downward movement of the cutting blade causes the blade to enter the workpiece to begin the actual cutting operation. It is important to note at this point that at the instant the blade hits the workpiece, the confinement unit is completely encircling the blade and lying along the top of the workpiece so that the debris caused by the cutting operation cannot escape from the confinement unit but rather is forced into discharge tube 70 and out through the hose 72. When the blade is in its full downward position for cutting, such as shown in FIG. 3, it can be seen that the water discharged against the cutting blade is carried by the blade in the direction shown by the arrows 98 into the discharge tube 70. In addition, the dust and other particles resulting from the cut are carried along with the water into the discharge tube. It can also be seen that closing plate 56 has now covered the slot 54 in housing 12 to thereby prevent any possible escape of dust or water from the housing except through the discharge tube. At the completion of the cutting operation the operator lifts the saw by means of handle 38, at which time the springs 44 and 78 cause the confinement unit once again to completely cover the cutting blade so that the final dust particles and water particles are effectively carried into the discharge tube. The water and power to the tool are then discontinued and the operation is then completed.

It can be seen that a dust and water confinement unit has been disclosed above which satisfies the objects of the invention. Changes in construction will occur to those skilled in the art and various apparently different modifications and embodiments may be made without departing from the scope of the invention. The matter set forth in the foregoing description and accompanying drawings is offered by way of illustration only.

I claim:

1. A dust and water confinement unit for a conventional circular saw, said saw having a handle portion and a circular cutting blade, said confinement unit comprising a rigid integral housing member having a generally circular configuration for receiving and substantially enclosing said cutting blade, a base plate secured to said housing member generally at right angles thereto, pivot means on said base plate for receiving said handle portion of the circular saw at a point remote from said cutting blade whereby the saw and housing member are capable of pivotal movement relative to each other, slot means in said housing member for receiving an arbor of the circular saw and cover means for covering said slot during cutting movement of the saw, liquid fluid inlet means disposed in an end surface of said housing member located nearest said pivot means and adjacent said base plate, spring biasing means for biasing said saw into said housing member away from said base plate, and a discharge tube extending from said housing member at a point adjacent said base plate and distant from said fluid means.

2. A confinement unit as set forth in claim 1, further comprising air inlet apertures disposed along a lower surface of said housing member adjacent said end surface and remote from said discharge tube.

3. A confinement unit as set forth in claim 2 wherein said biasing means comprises an adjustable spring unit for pivotal connection between said saw and said base plate.

4. A confinement unit as set forth in claim 2 wherein said fluid inlet means is substantially U-shaped and has fluid discharge apertures for directing fluid against the edge and side faces of the cutting blade and wherein one of said air inlet apertures is located in said housing end surface below said fluid inlet means.

5. A confinement unit as set forth in claim 1 wherein said discharge tube extends from a side surface of said housing member at an acute angle to said housing member and to said base plate.

6. A confinement unit as set forth in claim 1 wherein said cover means is carried by said arbor.

* * * * *